United States Patent
Tatewaki et al.

(10) Patent No.: US 8,932,182 B2
(45) Date of Patent: Jan. 13, 2015

(54) COAST STOP VEHICLE AND CONTROL METHOD FOR COAST STOP VEHICLE

(75) Inventors: Keichi Tatewaki, Atsugi (JP); Naohiro Yamada, Atsugi (JP); Shinichiro Watanabe, Yokohama (JP); Noritaka Aoyama, Atsugi (JP)

(73) Assignee: JATCO Ltd, Fuji-shi (JP)

( * ) Notice: Subject to any disclaimer, the term of this patent is extended or adjusted under 35 U.S.C. 154(b) by 453 days.

(21) Appl. No.: 13/301,167

(22) Filed: Nov. 21, 2011

(65) Prior Publication Data
US 2012/0135840 A1    May 31, 2012

(30) Foreign Application Priority Data

Nov. 25, 2010  (JP) ................................. 2010-262423

(51) Int. Cl.
| | | |
|---|---|---|
| *B60W 10/10* | (2012.01) | |
| *B60W 30/18* | (2012.01) | |
| *B60W 10/06* | (2006.01) | |
| *B60W 10/115* | (2012.01) | |
| *B60W 10/107* | (2012.01) | |

(52) U.S. Cl.
CPC ......... *B60W 30/18072* (2013.01); *B60W 10/06* (2013.01); *B60W 10/115* (2013.01); *B60W 10/107* (2013.01); *B60W 2540/10* (2013.01); *B60W 2710/1005* (2013.01)
USPC ....................................................... 477/135

(58) Field of Classification Search
None
See application file for complete search history.

(56) References Cited

U.S. PATENT DOCUMENTS

| | | | |
|---|---|---|---|
| 6,719,664 | B2 | 4/2004 | Ito et al. |
| 6,773,372 | B2 | 8/2004 | Matsubara et al. |
| 6,860,833 | B2 | 3/2005 | Ayabe |
| 6,908,413 | B2 | 6/2005 | Ayabe et al. |
| 7,294,092 | B2 | 11/2007 | Walker et al. |
| 7,670,257 | B2 * | 3/2010 | Popp et al. ........................ 477/6 |
| 2004/0058779 | A1 | 3/2004 | Ayabe |
| 2004/0102288 | A1 | 5/2004 | Ayabe et al. |

FOREIGN PATENT DOCUMENTS

| | | |
|---|---|---|
| JP | 2006-138426 A | 6/2006 |
| JP | 2006-170295 A | 6/2006 |

OTHER PUBLICATIONS

S. Watanabe, U.S. PTO Notice of Allowance, U.S. Appl. No. 13/301,191, dated Jul. 18, 2013, 10 pages.
S. Watanabe, U.S. PTO Office Action, U.S. Appl. No. 13/301,191, dated Apr. 9, 2013, 8 pages.
U.S. Appl. No. 13/301,191, filed Nov. 21, 2011, Watanabe.

* cited by examiner

*Primary Examiner* — Robert A Siconolfi
*Assistant Examiner* — Huan Le
(74) *Attorney, Agent, or Firm* — Foley & Lardner LLP

(57) ABSTRACT

A coast stop vehicle, includes an engine, a transmission arranged between the engine and drive wheels and having a plurality of gear positions, a coast stop starting unit which automatically stops the engine when a coast stop start condition holds during travel, a coast stop releasing unit which automatically starts the engine when a coast stop release condition holds during a coast stop, and a downshifting unit which starts engagement of a frictional engagement element, which realizes a lower gear position than the one when the coast stop release condition holds, before complete explosion of the engine and causes a downshift of the transmission when the coast stop release condition holds.

15 Claims, 8 Drawing Sheets

COAST STOP VEHICLE AND CONTROL METHOD FOR COAST STOP VEHICLE

FIELD OF THE INVENTION

The present invention relates to a coast stop technology for automatically stopping an engine during travel of a vehicle.

BACKGROUND OF THE INVENTION

JP2006-138426A discloses a coast stop technology for suppressing fuel consumption amount by automatically stopping an engine when a coast stop start condition (e.g. accelerator is off, brake is on and a vehicle speed is in a low speed region) holds during travel of a vehicle and starting the engine when a coast stop release condition holds thereafter for the purpose of reducing the fuel consumption amount.

SUMMARY OF THE INVENTION

For the purpose of ensuring drive power after the release of a coast stop and responding to an acceleration request of a driver, it is thought to shift down a transmission when the coast stop release condition holds and the engine is restarted. For example, when the coast stop release condition holds, the start-up of the engine (fuel injection) is started and a frictional engagement element, which realizes a lower gear position than the one set until then, is engaged after complete explosion of the engine.

However, in such a control, the transmission cannot transmit drive power until the engagement of the frictional engagement element that realizes the lower gear position is completed after the complete explosion of the engine. Thus, there is a time lag until acceleration increases and the acceleration request of the driver may not be possibly met.

The present invention aims to shorten a time required until it becomes possible to transmit drive power after the release of a coast stop in a coast stop vehicle which performs a downshift when the coast stop is released.

According to an aspect of the present invention, a coast stop vehicle includes an engine; a transmission arranged between the engine and drive wheels and having a plurality of gear positions; a coast stop starting unit which automatically stops the engine when a coast stop start condition holds during travel; a coast stop releasing unit which automatically starts the engine when a coast stop release condition holds during a coast stop; and a downshifting unit which starts engagement of a frictional engagement element, which realizes a lower gear position than the one when the coast stop release condition holds, before complete explosion of the engine and causes a downshift of the transmission when the coast stop release condition holds.

According to another aspect of the present invention a control method for a coast stop vehicle including an engine, and a transmission arranged between the engine and drive wheels and having a plurality of gear positions, is provided. The control method includes a coast stop starting step of automatically stopping the engine when a coast stop start condition holds during travel; a coast stop releasing step of automatically starting the engine when a coast stop release condition holds during a coast stop; and a downshifting step of starting engagement of a frictional engagement element, which realizes a lower gear position than the one when the coast stop release condition holds, before complete explosion of the engine and causing a downshift of the transmission when the coast stop release condition holds.

Embodiments and advantages of this invention will be described in detail below with reference to the attached figures.

DESCRIPTION OF THE PREFERRED EMBODIMENT

In the following description, a "speed ratio" of a certain transmission mechanism is a value obtained by dividing an input rotation speed of this transmission mechanism by an output rotation speed thereof. Further, a "lowest speed ratio" is a maximum speed ratio of the transmission mechanism and a "highest speed ratio" is a minimum speed ratio thereof.

Figure 1:
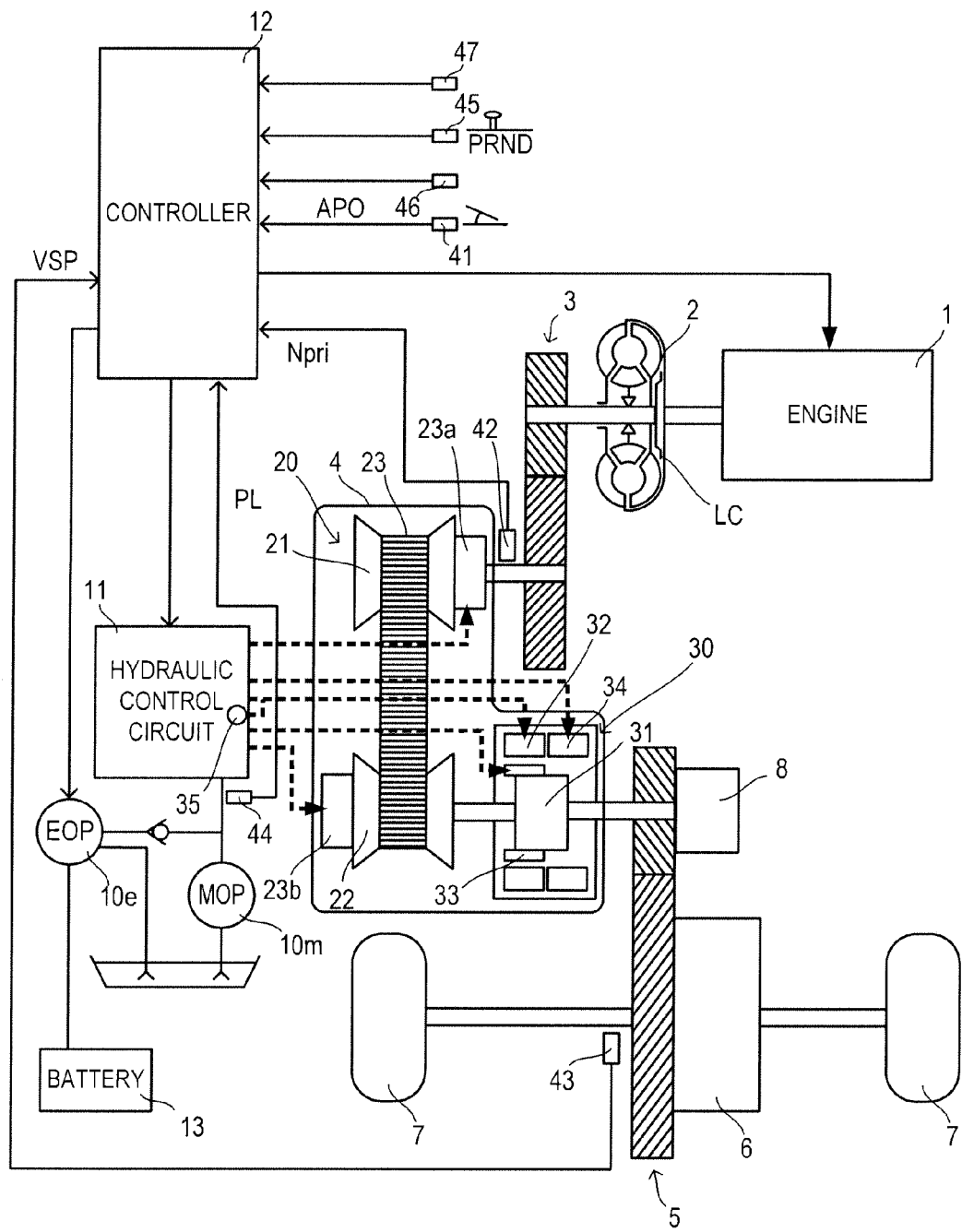
FIG. 1 is a schematic construction diagram of a coast stop vehicle according to an embodiment of the present invention.

FIG. 1 is a schematic construction diagram of a coast stop vehicle according to an embodiment of the present invention. This vehicle includes an engine 1 as a drive source, and output rotation of the engine 1 is transmitted to drive wheels 7 via a torque converter 2 with a lock-up clutch LC, a first gear train 3, a continuously variable transmission (hereinafter, merely referred to as a "transmission 4"), a second gear train 5 and a final reduction gear unit 6. The second gear train 5 includes a parking mechanism 8 for mechanically locking an output shaft of the transmission 4 in a parked state so as not to be able to rotate.

The transmission 4 is provided with a mechanical oil pump 10m to which the rotation of the engine 1 is input and which is driven by utilizing a part of power of the engine 1 and an electrical oil pump 10e which is driven upon receiving the supply of power from a battery 13. The electrical oil pump 10e is composed of an oil pump main body, and an electric motor and a motor driver for driving and rotating the oil pump main body and can control a driving load to a desired load or in multiple stages. Further, the transmission 4 includes a hydraulic control circuit 11 for adjusting a hydraulic pressure (hereinafter, referred to as a "line pressure PL") from the mechanical oil pump 10m or the electrical oil pump 10e and supplying the adjusted hydraulic pressure to the respective components of the transmission 4.

The lock-up clutch LC is engaged when a vehicle speed exceeds a lock-up start vehicle speed and released when the vehicle speed falls below a lock-up release vehicle speed. For example, the lock-up start vehicle speed is set at 6 km/h and the lock-up release vehicle speed is set at 12 km/h.

The transmission 4 includes a V-belt continuously variable transmission mechanism (hereinafter, referred to as a "variator 20") and a sub-transmission mechanism 30 provided in series with the variator 20. "To be provided in series" means that the variator 20 and the sub-transmission mechanism 30 are provided in series in a power transmission path from the engine 1 to the drive wheels 7. The sub-transmission mechanism 30 may be directly connected to an output shaft of the variator 20 as in this example or may be connected via another transmission or power transmission mechanism (e.g. gear train). Alternatively, the sub-transmission mechanism 30 may be connected to a front side (input shaft side) of the variator 20.

The variator 20 includes a primary pulley 21, a secondary pulley 22 and a V-belt 23 mounted between the pulleys 21 and 22. Each of the pulleys 21, 22 includes a fixed conical plate, a movable conical plate arranged with a sheave surface faced toward the fixed conical plate and forming a V-groove between the fixed conical plate and the movable conical plate, and a hydraulic cylinder 23a, 23b provided on the back surface of the movable conical plate for displacing the movable conical plate in an axial direction. When hydraulic pressures supplied to the hydraulic cylinders 23a, 23b are adjusted, the widths of the V-grooves change to change contact radii of the V-belt 23 and the respective pulleys 21, 22, whereby a speed ratio of the variator 20 continuously changes.

The sub-transmission mechanism 30 is a transmission mechanism with two forward speeds and one reverse speed. The sub-transmission mechanism 30 includes a Ravigneaux-type planetary gear mechanism 31 in which carriers of two planetary gears are coupled, and a plurality of frictional engagement elements (low brake 32, high clutch 33, reverse brake 34) which are connected to a plurality of rotation elements constituting the Ravigneaux-type planetary gear mechanism 31 to change coupled states of these rotation elements. If hydraulic pressures supplied to the respective frictional engagement elements 32 to 34 are adjusted to change engaged and released states of the respective frictional engagement elements 32 to 34, a gear position of the sub-transmission mechanism 30 is changed.

For example, the sub-transmission mechanism 30 is set to a first gear position if the low brake 32 is engaged and the high clutch 33 and the reverse brake 34 are released. The transmission mechanism 30 is set to a second gear position with a gear ratio lower than in the first gear position if the high clutch 33 is engaged and the low brake 32 and the reverse brake 34 are released. Further, the sub-transmission mechanism 30 is set to a reverse gear position if the reverse brake 34 is engaged and the low brake 32 and the high clutch 33 are released. In the following description, a case where the sub-transmission mechanism 30 is in the first gear position is expressed by that "the transmission 4 is in a low-speed mode" and a case where the sub-transmission mechanism 30 is in the second gear position is expressed by that "the transmission 4 is in a high-speed mode".

The respective frictional engagement elements are provided before or behind the variator 20 on the power transmission path, and any of them enables power transmission of the transmission 4 when being engaged while disabling power transmission of the transmission 4 when being released.

Further, an accumulator 35 is connected at an intermediate position of an oil path for supplying the hydraulic pressure to the low brake 32. The accumulator 35 delays the supply and discharge of the hydraulic pressure to and from the low brake 32, suppresses a sudden increase in the hydraulic pressure supplied to the low brake 32 by accumulating the hydraulic pressure at the time of selecting an N-D shift and prevents the occurrence of a shock due to sudden engagement of the low brake 32.

Figure 2:
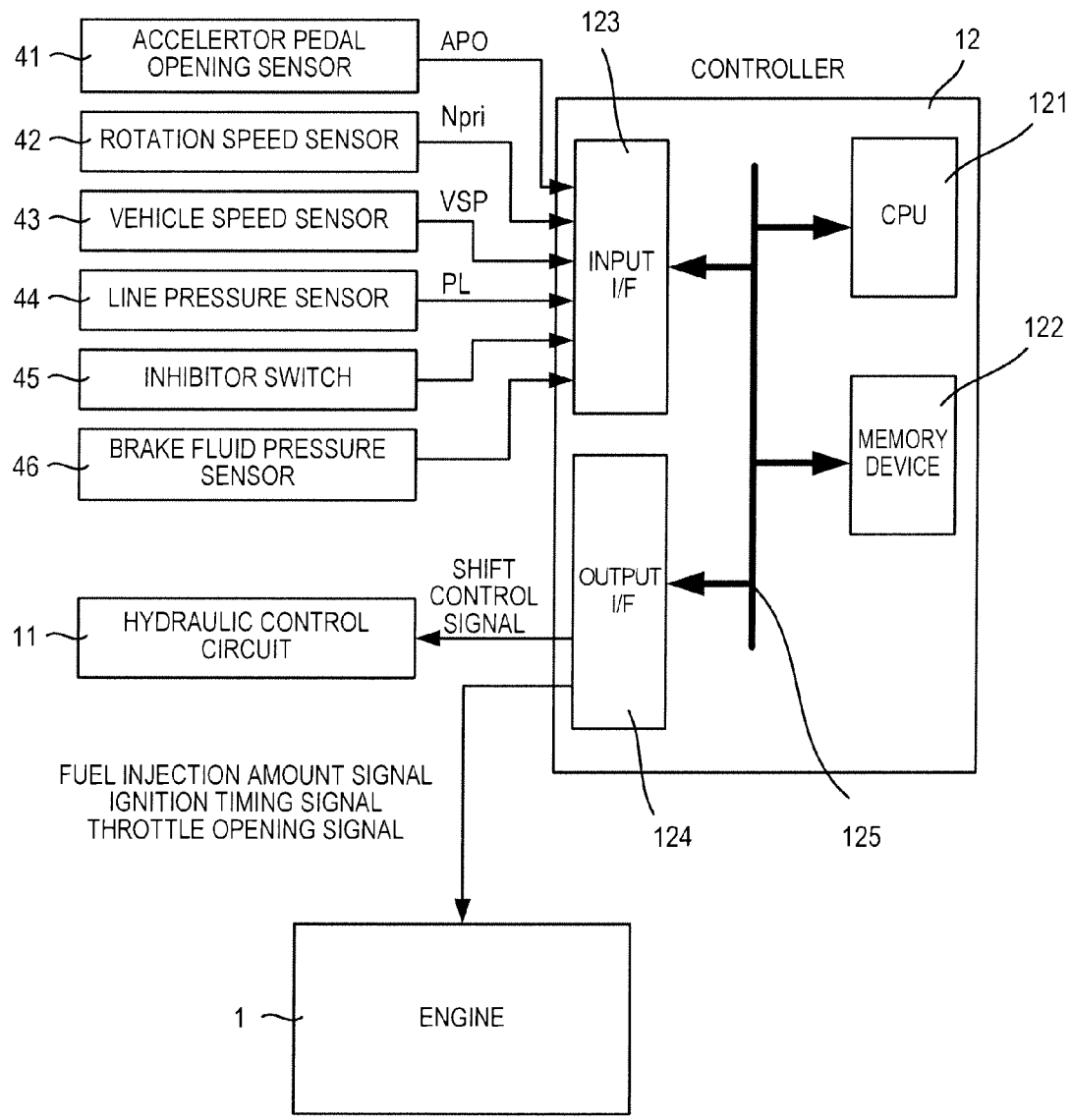
FIG. 2 is a diagram showing the internal configuration of a controller.

A controller 12 is a controller for controlling the engine 1 and the transmission 4 in a comprehensive manner and includes a CPU 121, a memory device 122 composed of a RAM/ROM, an input interface 123, an output interface 124 and a bus 125 which connects these components to each other as shown in FIG. 2.

To the input interface 123 are input an output signal of an accelerator pedal opening sensor 41 for detecting an accelerator pedal opening APO which is an operated amount of an accelerator pedal, an output signal of a rotation speed sensor 42 for detecting an input rotation speed of the transmission 4 (=rotation speed of the primary pulley 21, hereinafter, referred to as a "primary rotation speed Npri"), an output signal of a vehicle speed sensor 43 for detecting a vehicle speed VSP, an output signal of a line pressure sensor 44 for detecting the line pressure PL, an output signal of an inhibitor switch 45 for detecting the position of a select lever, an output signal of a brake fluid pressure sensor 46 for detecting a brake fluid pressure, and like output signals.

A control program of the engine 1, a transmission control program of the transmission 4, and various maps/tables used in these programs are stored in the memory device 122. The CPU 121 reads the programs stored in the memory device 122 and implements them, performs various computations on various signals input via the input interface 123 to generate a fuel injection amount signal, an ignition timing signal, a throttle opening signal, a transmission control signal and a drive signal for the electrical oil pump 10e and outputs the generated signals to the engine 1, the hydraulic control circuit 11 and the motor driver of the electrical oil pump 10e via the output interface 124. Various values used in the computations by the CPU 121 and computation results are appropriately stored in the memory device 122.

The hydraulic control circuit 11 is composed of a plurality of flow paths and a plurality of hydraulic control valves. In accordance with the transmission control signal from the controller 12, the hydraulic control circuit 11 controls the plurality of hydraulic control valves to switch supply paths of the hydraulic pressures, prepares a necessary hydraulic pressure from a hydraulic pressure produced by the mechanical oil pump 10m or the electrical oil pump 10e, and supplies this to the respective components of the transmission 4. In this way, the speed ratio of the variator 20 and the gear position of the sub-transmission mechanism 30 are changed to shift the transmission 4.

Figure 3:
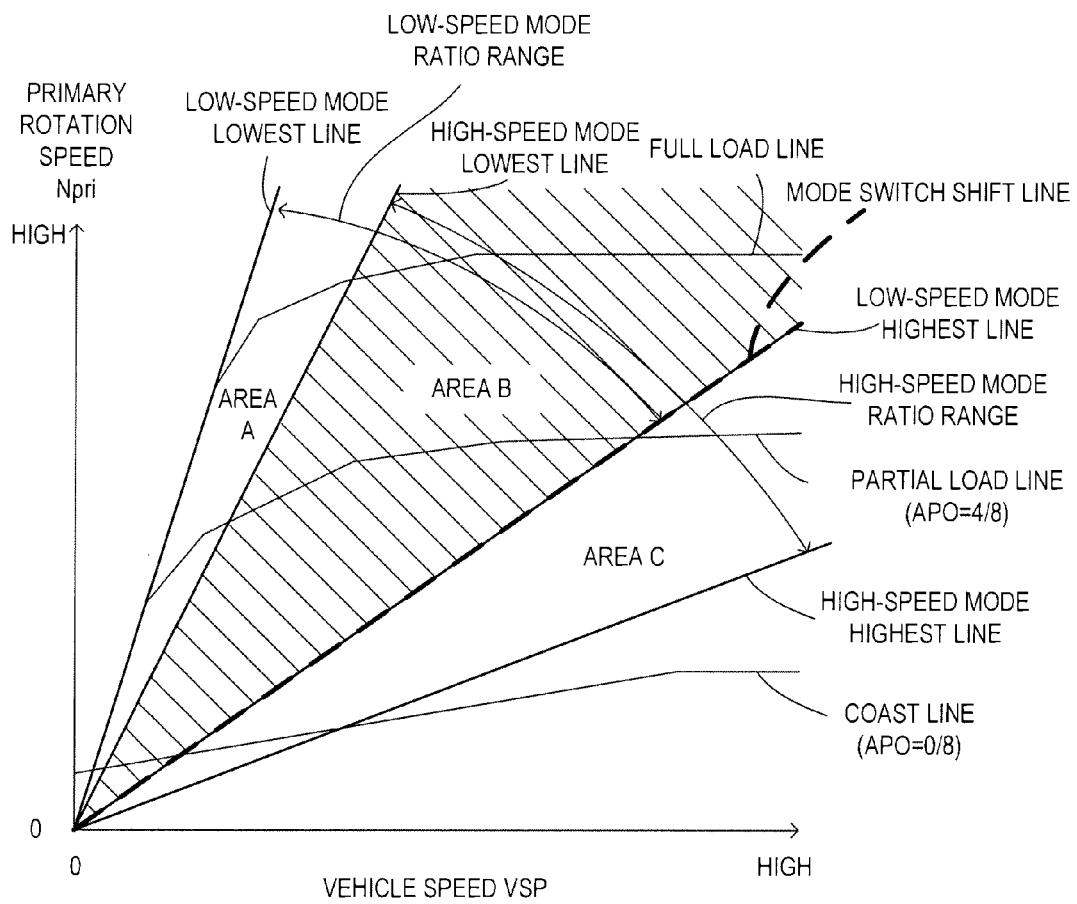
FIG. 3 is a graph showing an example of a shift map.

FIG. 3 shows an example of a shift map stored in the memory device 122. The controller 12 controls the variator 20 and the sub-transmission mechanism 30 according to a driving condition of the vehicle (in this embodiment, vehicle speed VSP, primary rotation speed Npri, accelerator pedal opening APO) based on this shift map.

In this shift map, an operating point of the transmission 4 is defined by the vehicle speed VSP and the primary rotation speed Npri. The inclination of a line connecting the operating point of the transmission 4 and a zero point at the lower left corner of the shift map corresponds to the speed ratio of the transmission 4 (overall speed ratio obtained by multiplying the speed ratio of the variator 20 by a speed ratio of the sub-transmission mechanism 30, hereinafter, referred to as a "through speed ratio"). In this shift map, a shift line is set for each accelerator pedal opening APO similar to a shift map of a conventional V-belt continuously variable transmission, and the transmission 4 is shifted in accordance with the shift line selected based on the accelerator pedal opening APO. Note that, for simplicity, only a whole load line (shift line when the accelerator pedal opening APO=8/8), a partial line (shift line when the accelerator pedal opening APO=4/8) and a coast line (shift line when the accelerator pedal opening APO=0/8) are shown in FIG. 3.

When being in the low-speed mode, the transmission 4 can be shifted between a low-speed mode lowest line obtained by setting the speed ratio of the variator 20 to the lowest speed ratio and a low-speed mode highest line obtained by setting the speed ratio of the variator 20 to the highest speed ratio. In this case, the operating point of the transmission 4 moves in areas A and B. On the other hand, when being in the high-speed mode, the transmission 4 can be shifted between a high-speed mode lowest line obtained by setting the speed ratio of the variator 20 to the lowest speed ratio and a high-speed mode highest line obtained by setting the speed ratio of the variator 20 to the highest speed ratio. In this case, the operating point of the transmission 4 moves in areas B and C.

The speed ratio of each gear position of the sub-transmission mechanism 30 is so set that the speed ratio corresponding to the low-speed mode highest line (low-speed mode highest speed ratio) is lower than the speed ratio corresponding to the high-speed mode lowest line (high-speed mode lowest speed ratio). By this, a range of the through speed ratio of the transmission 4 that can be set in the low-speed mode ("low-speed mode ratio range" in FIG. 3) and a range of the through speed ratio of the transmission 4 that can be set in the high-speed mode ("high-speed mode ratio range" in FIG. 3) partly overlap, and the transmission 4 can be selectively set in either one of the low-speed mode and the high-speed mode if the operating point of the transmission 4 is in the area B defined between the high-speed mode lowest line and the low-speed mode highest line.

Further, on this shift map, a mode switch shift line at which the sub-transmission mechanism 30 is shifted is so set as to overlap the low-speed mode highest line. A through speed ratio corresponding to the mode switch shift line (hereinafter, referred to as a "mode switch speed ratio mRatio") is set at a value equal to the low-speed mode highest speed ratio. The mode switch shift line is set in this way because an input torque to the sub-transmission mechanism 30 decreases as the speed ratio of the variator 20 decreases and a shift shock when the sub-transmission mechanism 30 is shifted can be suppressed.

When the operating point of the transmission 4 crosses the mode switch shift line, i.e. an actual value of the through speed ratio (hereinafter, referred to as an "actual through speed ratio Ratio") changes over the mode switch speed ratio mRatio, the controller 12 performs a synchronization shift described below to switch between the high-speed mode and the low-speed mode.

In the synchronization shift, the controller 12 shifts the sub-transmission mechanism 30 and changes the speed ratio of the variator 20 in a direction opposite to a direction in which the speed ratio of the sub-transmission mechanism 30 changes. At this time, an inertial phase in which the speed ratio of the sub-transmission mechanism 30 actually changes and a period during which the speed ratio of the variator 20 changes are synchronized. The speed ratio of the variator 20 is changed in the direction opposite to the changing direction of the speed ratio of the sub-transmission mechanism 30 so that a change in input rotation caused by a difference in the actual through speed ratio Ratio does not give a sense of incongruity to a driver.

Specifically, when the actual through speed ratio Ratio of the transmission 4 changes over the mode switch speed ratio mRatio from the low side to the high side, the controller 12 changes the gear position of the sub-transmission mechanism 30 from the first gear position to the second gear position (1-2 shift, upshift) and changes the speed ratio of the variator 20 to the low side.

Conversely, when the actual through speed ratio Ratio of the transmission 4 changes over the mode switch speed ratio mRatio from the high side to the low side, the controller 12 changes the gear position of the sub-transmission mechanism 30 from the second gear position to the first gear position (2-1 shift, downshift) and changes the speed ratio of the variator 20 to the high side.

Such a downshift is performed when the accelerator pedal is depressed or when the vehicle decelerates in a state where the accelerator pedal opening APO is larger than a predetermined small opening (e.g. accelerator pedal opening APO=1/8).

When the vehicle decelerates in the state where the accelerator pedal opening APO is smaller than the predetermined small opening and the actual through speed ratio Ratio of the transmission 4 changes over the mode switch shift ratio mRatio from the high side to the low side, the sub-transmission mechanism 30 is not shifted down and the speed ratio of the variator 20 is changed to the low side with the gear position of the sub-transmission mechanism 30 kept in the second gear position.

The sub-transmission mechanism 30 is shifted down when the accelerator pedal is depressed (when the accelerator pedal opening APO exceeds the predetermined small opening), when an acceleration request is given such as through the operation of the select lever from D-range to L-range or after the vehicle stops, whereby a shift shock caused by an inertia change is suppressed.

Further, the controller 12 performs a coast stop described below to improve fuel economy by suppressing the fuel consumption amount of the engine 1.

The coast stop is a technology for automatically stopping the engine 1 to suppress the fuel consumption amount while the vehicle is running in a low speed region (coast stop). This control is common to a fuel cut control executed when the accelerator is off in that fuel supply to the engine 1 is stopped, but differs therefrom in that the power transmission path between the engine 1 and the drive wheels 7 is cut off and the rotation of the engine 1 is completely stopped since the lock-up clutch LC is released (□ lock-up release vehicle speed≥coast stop permitting vehicle speed described later).

Upon executing the coast stop control, the controller 12 first judges conditions a1 to a4 listed below.
- a1: accelerator pedal is not depressed at all (accelerator pedal opening APO=0)
- a2: brake pedal is depressed (brake fluid pressure is a predetermined value or higher)
- a3: vehicle speed is the coast stop permitting vehicle speed (e.g. 9 km/h) or lower
- a4: lock-up clutch LC is released.

These conditions are, in other words, conditions to judge whether or not a driver has an intention to stop the vehicle.

The controller 12 judges that a coast stop start condition holds when all of these conditions a1 to a4 hold.

When judging that the coast stop start condition holds, the controller 12 stops fuel supply to the engine 1 to stop the engine 1 and starts the drive of the electrical oil pump 10e.

Further, the controller 12 determines whether or not the above conditions a1 to a4 respectively continue to hold and determines the position of the select lever also during the coast stop. When even one of the above conditions a1 to a4 no longer holds, the select lever is operated from D-range to L-range or a manual mode is selected by the select lever and a downshift operation is performed, the controller 12 determines that a coast stop release condition holds and stops the coast stop, i.e. resumes fuel supply to the engine 1 to start the engine 1. Then, the controller 12 stops the electrical oil pump 10e when the mechanical oil pump 10m comes to produce a sufficient hydraulic pressure.

Particularly, when the coast stop release condition holds because the accelerator pedal is depressed (condition a1) or a predetermined select lever operation is performed, there is an acceleration request from the driver. Thus, the controller 12 not only starts the engine 1, but also shifts down the sub-transmission mechanism 30 to increase drive power and ensure acceleration performance.

Contents of controls executed by the controller 12 are further described with reference to flow charts of FIGS. 4 to 6.

Figure 4:
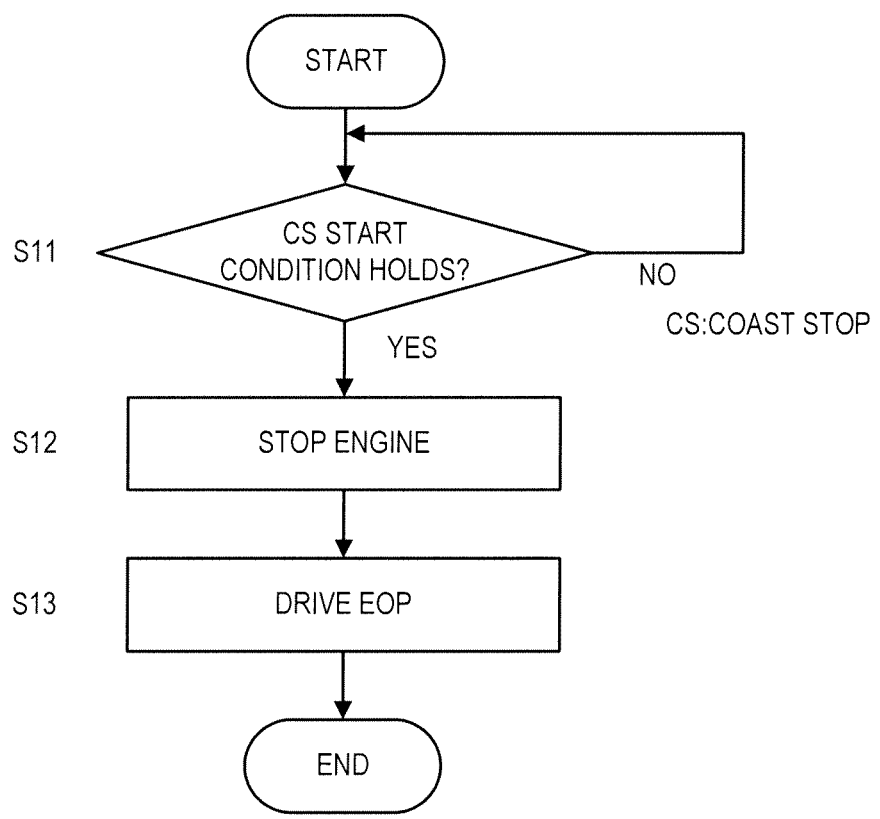
FIG. 4 is a flow chart showing contents of a coast stop start control executed by the controller.

FIG. 4 is a flow chart of a coast stop start control executed by the controller 12. This control is executed while the coast stop is not performed.

In S11, the controller 12 judges whether or not the coast stop start condition holds. The coast stop start condition is judged to hold when all of the above conditions a1 to a4 hold. The process proceeds to S12 when the coast stop start condition is judged to hold, whereas S11 is repeated unless otherwise.

In S12, the controller 12 stops fuel supply to the engine 1 to stop the engine 1. Since the lock-up clutch LC is released when the coast stop start condition holds, the engine 1 is completely stopped thereafter.

In S13, the controller 12 starts the drive of the electrical oil pump 10e to maintain the engaged state of the frictional engagement element that realizes the gear position at the time of starting the coast stop, i.e. the high clutch 33 that realizes the second gear position.

Figure 5:
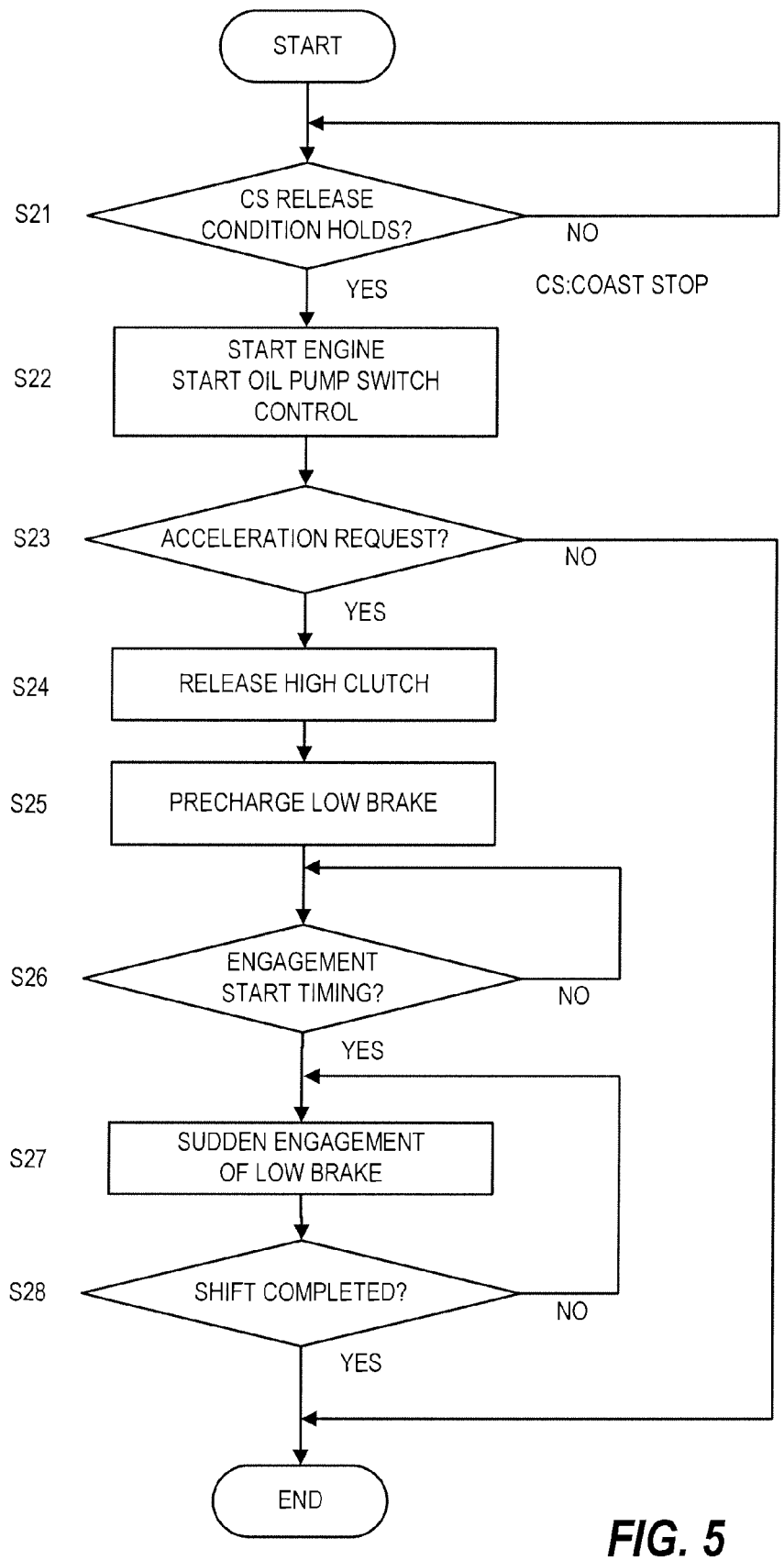
FIG. 5 is a flow chart showing contents of a coast stop release control executed by the controller.

FIG. 5 is a flow chart of a coast stop release control executed by the controller 12. This control is executed while the coast stop is performed.

In S21, the controller 21 judges whether or not the coast stop release condition holds. The coast stop release condition is judged to hold when any one of the above conditions a1 to a4 no longer holds or when a predetermined select lever operation (switch operation from D-range to L-range, switch from D-range to the manual mode and a downshift operation) is performed. The process proceeds to S22 when the coast stop release condition is judged to hold, whereas S21 is repeated unless otherwise.

In S22, the controller 12 causes the engine 1 to be cranked and resumes fuel supply to the engine 1 to start the startup of the engine 1. Further, the controller 12 executes an oil pump switch control shown in FIG. 6. The oil pump switch control is described later.

In S23, the controller 12 judges whether or not there is any acceleration request of a driver. If the coast stop release condition holds because the accelerator pedal was depressed or the predetermined select lever operation was performed, the presence of the acceleration request is judged and the process proceeds to S24.

In the absence of the acceleration request, the process ends. That is, only the start-up of the engine 1 is performed and the gear position at the time of releasing the coast stop, i.e. the second gear position is maintained.

In S24, the controller 12 reduces an instruction pressure to the high clutch 33 to release the high clutch 33. Note that "release" mentioned here includes a reduction of transmission capacity of the high clutch 33 (transmittable torque) to below an input torque. When the high clutch 33 is released, the input rotation speed of the sub-transmission mechanism 30 increases. This is because a turbine of the torque converter 2 rotates together as the engine 1 rotates more and this rotation of the turbine is transmitted to the sub-transmission mechanism 30 via the variator 20.

In S25, a supply pressure to the low brake 32 is increased by increasing an instruction pressure to the low brake 32 in a stepwise manner (precharging), thereby narrowing a clearance between clutch plates constituting the low brake 32. In this way, the low brake 32 is controlled to a state immediately before engagement capacity is produced.

In S26, the controller 12 judges whether or not an engagement start timing of the low brake 32 has arrived. The engagement start timing of the low brake 32 is such that, if sudden engagement of the low brake 32 to be described later is started to produce and increase the engagement capacity of the low brake 32 in the state immediately before the low brake 32 produces the engagement capacity, the engagement of the low brake 32 is completed when the input rotation speed of the sub-transmission mechanism 30 coincides with an input rotation speed realized after the sub-transmission mechanism 30 is shifted down (hereinafter, referred to as an "after-downshift input rotation speed"). Here, the "start of engagement" and the "completion of engagement" of the low brake 32 respectively indicate the start of production of the engagement capacity by the low brake 32 and an increase of the transmission capacity of the low brake 32 to or above the input torque.

The engagement start timing of the low brake 32 set in this way is after the input rotation of the sub-transmission mechanism 30 starts to increase and before the complete explosion of the engine 1 (before settlement in idle rotation, preferably during the rev-up immediately after the start-up). Whether the engine 1 is during cranking or increasing its rotation by itself depends on the vehicle speed VSP. When the vehicle speed VSP is low, the engagement of the low brake 32 is started during the cranking of the engine 1.

More specifically, if tx denotes a time at which the input rotation speed of the sub-transmission mechanism 30 coincides with the after-downshift input rotation speed and Δt denotes a period required until the engagement of the low brake 32 is completed after the engagement of the low brake 32 is started, the engagement start timing of the low brake 32 is a time tx−Δt.

The time tx is estimated, for example, based on a rotation increase (rev-up) speed at the start-up of the engine 1, a deviation between the input rotation speed of the sub-transmission mechanism 30 and the after-downshift input rotation speed and an increase speed of the hydraulic pressure supplied to the low brake 32 planned in subsequent S27. Since a rotation speed increasing state at the start-up of the engine 1 is substantially the same irrespective of a driving condition (e.g. gear position of the sub-transmission mechanism 30, whether or not the accelerator pedal is depressed, depressed amount of the accelerator pedal, vehicle speed VSP, etc.), the time tx can be estimated with high accuracy without using any complex control.

The process proceeds to S27 when the engagement start timing of the low brake 32 is judged to have arrived, whereas the processing of S26 is repeated unless otherwise.

In S27, the controller 12 increases the instruction pressure to the low brake 32 to start sudden engagement of the low brake 32. The "sudden engagement" means to increase the hydraulic pressure at a speed faster than a hydraulic pressure increase speed at the time of a not vial downshift. Further, the hydraulic pressure supplied to the low brake 32 is so controlled that the input rotation speed of the sub-transmission mechanism 30 does not exceed the after-downshift input rotation speed.

Since the engagement of the low brake 32 is started at the engagement start liming judged in S26, it is completed when the input rotation speed of the sub-transmission mechanism 30 coincides with the after-downshift input rotation speed and the input rotation speed of the sub-transmission mechanism 30 does not exceed the after-downshift input rotation speed. Thus, a shift shock associated with an inertia change when the low brake 32 is engaged is substantially suppressed.

In S28, the controller 12 judges whether or not the engagement of the low brake 32 has been completed. The process ends when the engagement of the low brake 32 is judged to have been completed and a return is made to S27 to repeat the processings of S27, S28 unless otherwise.

Figure 6:
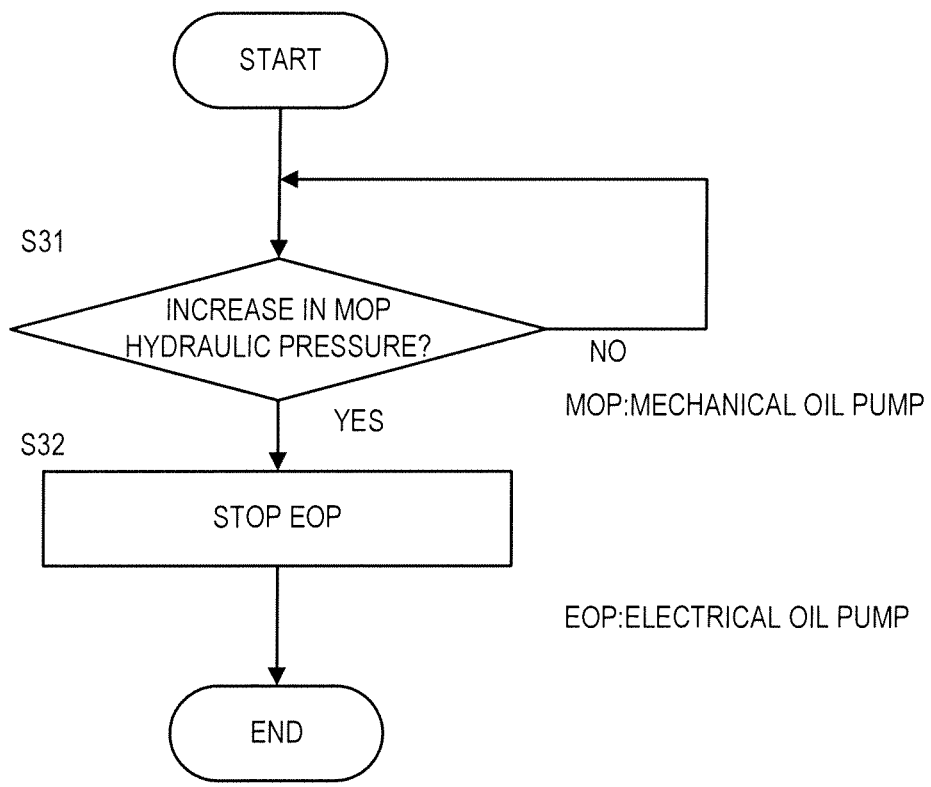
FIG. 6 is a flow chart showing contents of an oil pump switch control executed by the controller.

FIG. 6 is a flow chart of the oil pump switch control executed by the controller 12. This control is simultaneously executed when the start-up of the engine is started in S22 of FIG. 5.

In S31, the controller 12 judges whether or not a sufficient hydraulic pressure is produced by the mechanical oil pump 10m, specifically the hydraulic pressure by the mechanical oil pump 10m is in excess of that by the electrical oil pump 10e. The process proceeds to S32 when the hydraulic pressure by the mechanical oil pump 10m is judged to be in excess of the hydraulic pressure by the electrical oil pump 10e, whereas S32 is repeated unless otherwise.

In S32, the controller 12 stops the electrical oil pump 10e. In this way, the pump for supplying the hydraulic pressure to the frictional engagement elements of the transmission 4 is switched from the electrical oil pump 10e to the mechanical oil pump 10m.

Next, functions and effects achieved by executing the above control are described.

Figure 7:
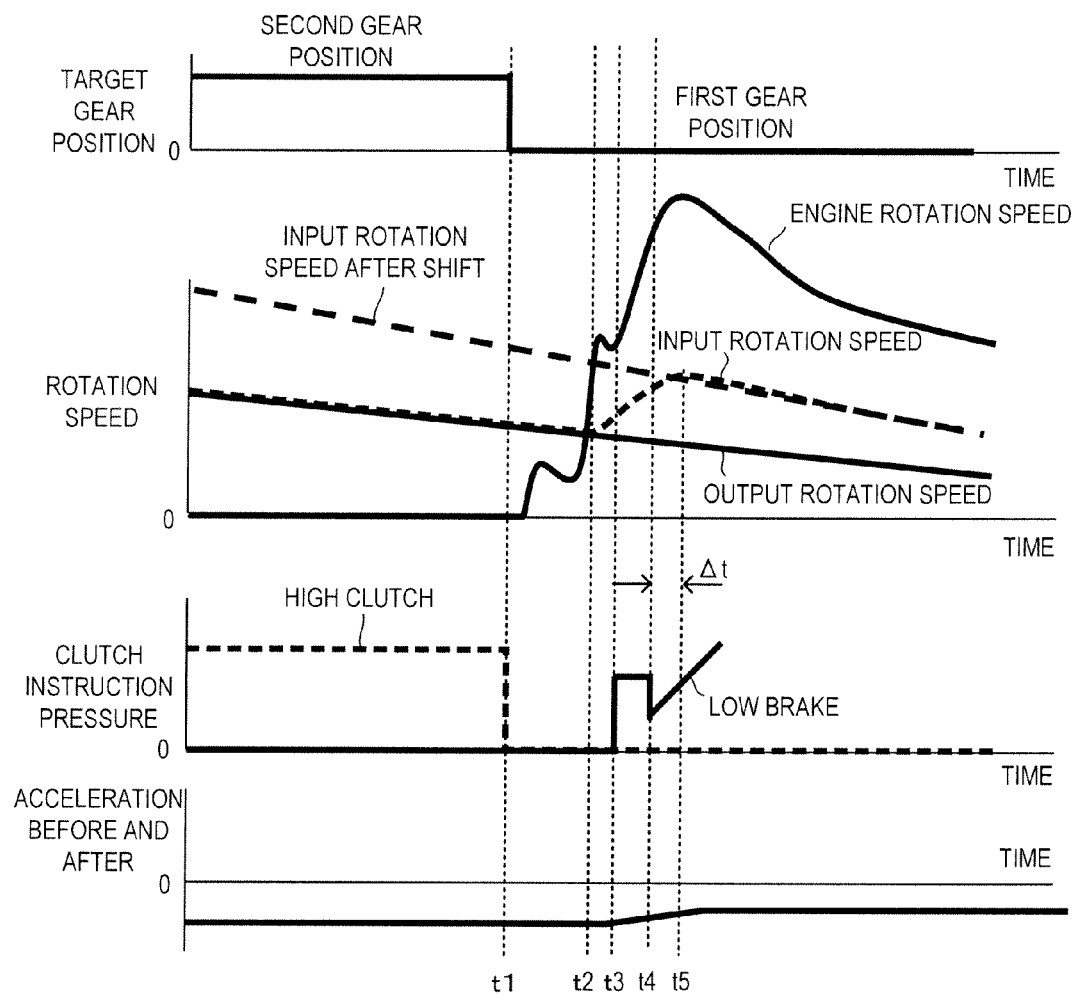
FIG. 7 is a time chart showing functions and effects of this embodiment.

FIG. 7 is a time chart showing a state when the accelerator pedal is depressed during the coast stop.

At time t1, the accelerator pedal is depressed, whereby the coast stop release condition holds and cranking and fuel injection of the engine 1 are started. The high clutch 33 is substantially simultaneously released.

At time t2, the rotation of the engine 1 is transmitted to the sub-transmission mechanism 30 via the torque converter 2 and the variator 20 and the input rotation speed of the sub-transmission mechanism 30 starts to increase.

At time t3, the instruction pressure to the low brake 32 is increased in a stepwise manner to precharge the hydraulic pressure to the low brake 32 and the low brake 32 is controlled to the state immediately before the engagement capacity is produced. Note that although the hydraulic pressure to the low brake 32 is precharged after the release of the high clutch 33, it is preferable to do so immediately before sudden engagement of the low brake 32 following the release of the high clutch 33 in terms of suppressing fuel consumption.

Time t4 is a time earlier than a time at which the input rotation speed of the sub-transmission mechanism 30 coincides with the after-downshift input rotation speed (time t5 in this example) by the period Δt required for sudden engagement of the low brake 32. At this time t4, the instruction pressure to the low brake 32 is increased at a speed faster than during a normal downshift to start the engagement of the low brake 32 and produce and increase the engagement capacity of the low brake 32.

At time t5, the engagement of the low brake 32 is completed. Since the engagement of the low brake 32 is completed at the timing at which the input rotation speed of the sub-transmission mechanism 30 coincides with the after-downshift input rotation speed, there is almost no shock caused by an inertia torque and acceleration after the downshift is promptly realized. Further, since the engagement of the low brake 32 is completed during the rev-up of the engine 1, there is also an effect of suppressing the rev-up of the engine 1.

Thus, according to the above control, the time required until it becomes possible to transmit drive power after the engagement of the low brake 32 is completed can be shortened as compared with the case where the engagement of the low brake 32 is started after the complete explosion of the engine 1. Thus, the driver's intention to accelerate can be met.

Further, according to the above control, the engagement of the low brake 32 is started after the input rotation speed of the sub-transmission mechanism 30 increases. That is, the engagement of the low brake 32 is started after a deviation between the input rotation speed of the sub-transmission mechanism 30 and the after-downshift input rotation speed is reduced. Thus, the shift shock associated with the inertia change when the low brake 32 is engaged can be suppressed and abrasion of the low brake 32 can be reduced.

Particularly in the above control, the engagement of the low brake 32 is started at the timing earlier than the timing at which the input rotation speed of the sub-transmission mechanism 30 coincides with the after-downshift input rotation speed by the period required from the start to the completion of the engagement of the low brake 32. According to this, the engagement of the low brake 32 is completed in a state where a rotation speed difference is zero, wherefore the shift shock associated with the inertia change is substantially suppressed and abrasion of the low brake 32 can be further reduced.

The hydraulic pressure supplied to the low brake 32, i.e. transmission capacity is so controlled that the input rotation speed of the sub-transmission mechanism 30 does not exceed the after-downshift input rotation speed. Also by this, the rotation speed difference when the engagement of the low brake 32 is completed is further reduced and the shift shock associated with the inertia change when the low brake 32 is engaged is suppressed.

Note that the above downshift is preferably performed only when the coast stop is released in response to the acceleration request from the driver as in the above control in order to respond to the driver's acceleration request and not to cause acceleration/deceleration unintended by the driver.

Although the embodiment of the present invention has been described above, the above embodiment is merely one application example of the present invention and not of the nature to limit the technical scope of the present invention to the specific construction of the above embodiment.

For example, although the engagement of the low brake 32 is started at the timing earlier than the timing at which the input rotation speed of the sub-transmission mechanism 30 coincides with the after-downshift input rotation speed by the predetermined period in the above control, a deviation between the input rotation speed of the sub-transmission mechanism 30 and the after-downshift input rotation speed may be judged and the engagement of the low brake 32 may be started when this deviation becomes smaller than a predetermined value (value smaller than a deviation at the start of the engagement and set to be smaller as the period required for the engagement of the low brake 32 becomes shorter). Even by such a control, it is possible to suppress the shift shock associated with the inertial change when the low brake 32 is engaged and suppress abrasion of the low brake 32.

Further, although precharging for the low brake 32 is performed after the coast stop release condition holds and the low brake 32 is controlled to the state immediately before the engagement in the above control, the hydraulic pressure may be supplied to the low brake 32 and the low brake 32 may be controlled to the state immediately before the engagement by increasing a command value to the low brake 32 before the coast stop release condition holds.

Figure 8:
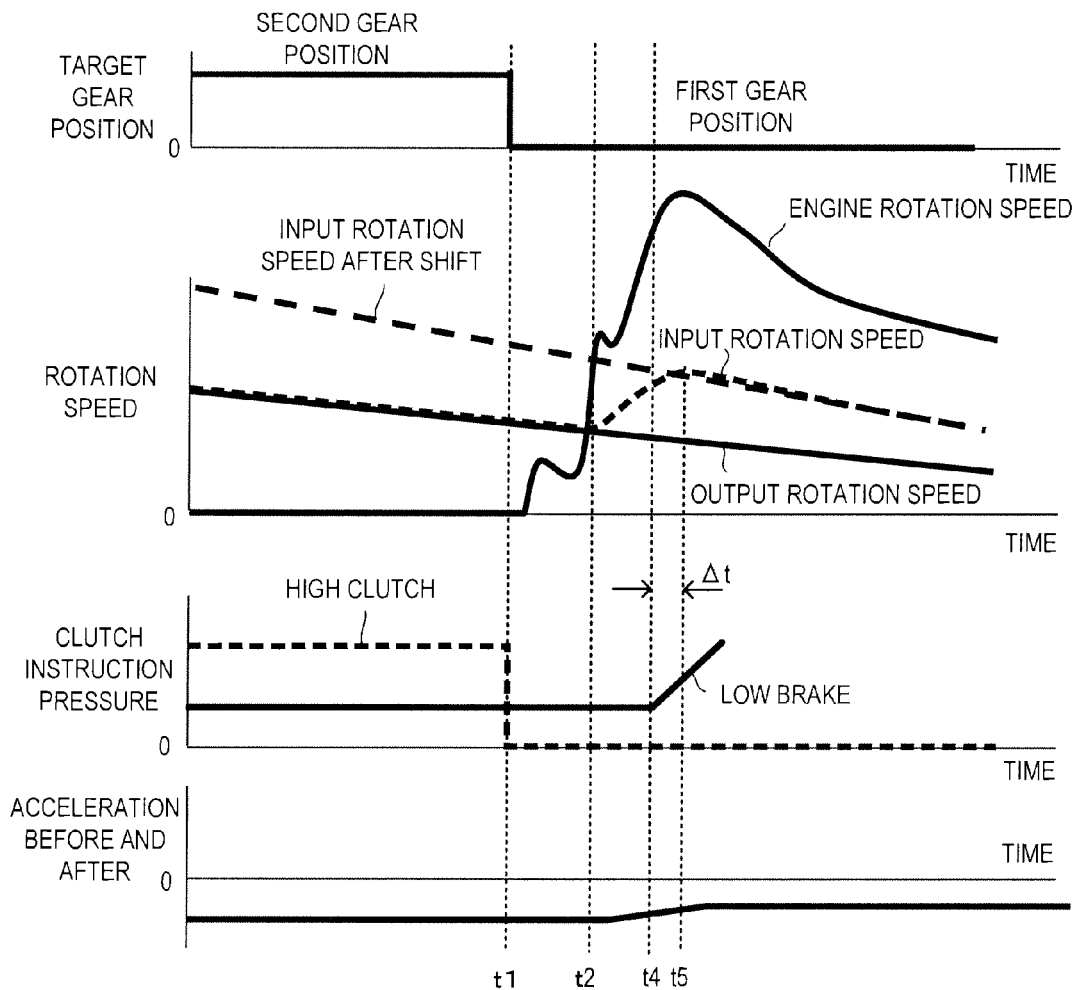
FIG. 8 is a time chart showing functions and effects of a modification of this embodiment.

FIG. 8 is a time chart in this case, and the low brake 32 is controlled to the state immediately before the engagement during the coast stop. Then, when the coast stop release condition holds, the start-up of the engine 1 is started and the engagement of the low brake 32 is started at time t4 earlier than time t5 at which the input rotation speed of the sub-transmission mechanism 30 coincides with the after-downshift input rotation speed by the period Δt required for sudden engagement of the low brake 32.

According to this construction, the engagement of the low brake 32 can be immediately started if the instruction pressure to the low brake 32 is increased. That is, a time for precharging is not necessary. Thus, even if a period until the input rotation speed of the sub-transmission mechanism 30 coincides with the after-downshift input rotation speed after the restart of the engine 1 is short, the engagement of the low brake 32 can be completed before this period elapses.

The above downshift at the time of releasing the coast stop may be performed regardless of an acceleration request at the time of releasing the coast stop. According to this construction, good acceleration performance can be realized even when an acceleration request is issued with delay (e.g. when the accelerator is turned on for acceleration after the brake is turned off to release the coast stop).

The sub-transmission mechanism 30 may have three or more gear positions. In this case, the gear position after the downshift is successively switched to the lower gear position according to the vehicle speed as the vehicle speed decreases during the coast stop. This can realize good acceleration performance by a downshift to an optimal gear position at the time of acceleration.

The above coast stop control is applicable not only to the continuously variable transmission 4 including the sub-transmission mechanism 30 as in this embodiment, but also to a transmission including only a stepped transmission mechanism.

This application claims priority based on Japanese Patent Application No. 2010-262423, filed with the Japan Patent Office on Nov. 25, 2010, the entire content of which is incorporated into this specification by reference.

What is claimed is:

1. A coast stop vehicle, comprising:
an engine;
a transmission arranged between the engine and drive wheels and having a plurality of gear positions;
a coast stop starting unit configured to automatically stop the engine when a coast stop start condition holds during travel;
a coast stop releasing unit configured to automatically start the engine when a coast stop release condition holds during a coast stop; and
a downshifting unit configured to start engagement of a frictional engagement element, which realizes a lower gear position than a gear position when the coast stop release condition holds, after a start-up of the engine and before a settlement of the engine in idle rotation such that a downshift of the transmission commences when the coast stop release condition holds.

2. The coast stop vehicle according to claim 1, wherein:
the downshifting unit is configured to start the engagement of the frictional engagement element after an input rotation speed of the transmission starts to increase.

3. The coast stop vehicle according to claim 1, wherein:
the downshifting unit is configured to start the engagement of the frictional engagement element at a timing earlier than a timing at which an input rotation speed of the transmission coincides with an after-downshift input rotation speed by a period required from start to completion of the engagement of the frictional engagement element.

4. The coast stop vehicle according to claim 1, wherein:
the downshifting unit is configured to start the engagement of the frictional engagement element when a deviation between an input rotation speed of the transmission and an after-downshift input rotation speed becomes equal to or smaller than a predetermined value.

5. The coast stop vehicle according to claim 1, wherein:
the downshifting unit is configured to control transmission capacity of the frictional engagement element so that an input rotation speed of the transmission does not exceed an after-downshift input rotation speed.

6. The coast stop vehicle according to claim 1, wherein:
the downshifting unit is configured to control the frictional engagement element to a state immediately before the engagement before the coast stop release condition holds.

7. The coast stop vehicle according to claim 1, wherein:
the downshifting unit is configured to perform the downshift only when the coast stop release condition holds and there is an acceleration request.

8. A control method for a coast stop vehicle including an engine, and a transmission arranged between the engine and drive wheels and having a plurality of gear positions, comprising:
automatically stopping the engine when a coast stop start condition holds during travel;
automatically starting the engine when a coast stop release condition holds during a coast stop; and
starting engagement of a frictional engagement element, which realizes a lower gear position than a gear position when the coast stop release condition holds, after a start-up of the engine and before a settlement of the engine in idle rotation such that a downshift of the transmission commences, when the coast stop release condition holds.

9. The control method according to claim 8, wherein:
starting engagement of the frictional engagement element comprises starting the engagement of the frictional engagement element after an input rotation speed of the transmission starts to increase.

10. The control method according to claim 8, wherein:
starting engagement of the frictional engagement element comprises starting the engagement of the frictional engagement element at a timing earlier than a timing at which an input rotation speed of the transmission coincides with an after-downshift input rotation speed by a period required from start to completion of the engagement of the frictional engagement element.

11. The control method according to claim 8, wherein:
starting engagement of the frictional engagement element comprises starting the engagement of the frictional engagement element when a deviation between an input rotation speed of the transmission and an after-downshift input rotation speed becomes equal to or smaller than a predetermined value.

12. The control method according to claim 8, wherein;
starting engagement of the frictional engagement element comprises controlling transmission capacity of the frictional engagement element so that an input rotation speed of the transmission does not exceed an after-downshift input rotation speed.

13. The control method according to claim 8, wherein:
starting engagement of the frictional engagement element comprises controlling the frictional engagement element to a state immediately before the engagement before the coast stop release condition holds.

14. The control method according to claim 8, wherein:
starting engagement of the frictional engagement element comprises performing the downshift only when the coast stop release condition holds and there is an acceleration request.

15. A coast stop vehicle, comprising:
an engine;
a transmission arranged between the engine and drive wheels and having a. plurality of gear positions;
coast stop starting means for automatically stopping the engine when a coast stop start condition holds during travel;
coast stop releasing means for automatically starting the engine where a coast stop release condition holds during a coast stop; and
downshifting means for starting engagement of a frictional engagement element, which realizes a lower gear position than a gear position when the coast stop release condition holds, after a start-up of the engine and before a settlement of the engine in idle rotation such that a downshift of the transmission commences when the coast stop release condition holds.

* * * * *